US012682797B2

(12) United States Patent
Lee

(10) Patent No.: US 12,682,797 B2
(45) Date of Patent: Jul. 14, 2026

(54) DISPLAY APPARATUS

(71) Applicant: LG Display Co., Ltd., Seoul (KR)

(72) Inventor: Jisoo Lee, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/193,475

(22) Filed: Apr. 29, 2025

(65) Prior Publication Data

US 2026/0170978 A1 Jun. 18, 2026

(30) Foreign Application Priority Data

Dec. 18, 2024 (KR) ........................ 10-2024-0189771

(51) Int. Cl.
*G09G 3/3233* (2016.01)
*G09G 3/00* (2006.01)

(52) U.S. Cl.
CPC ........... *G09G 3/006* (2013.01); *G09G 3/3233* (2013.01); *G09G 2300/0842* (2013.01); *G09G 2330/08* (2013.01)

(58) Field of Classification Search
CPC ............. G09G 3/3233; G09G 2330/08; G09G 2330/10; G09G 2330/12; G09G 2300/0413
See application file for complete search history.

(56) References Cited

U.S. PATENT DOCUMENTS

| | | | | |
|---|---|---|---|---|
| 9,583,542 B2 | 2/2017 | Park et al. | | |
| 2016/0104409 A1* | 4/2016 | Jeon | G09G 3/3233 345/690 |
| 2016/0163243 A1* | 6/2016 | Park | G09G 3/3258 345/87 |
| 2019/0355309 A1* | 11/2019 | Miwa | G09G 3/3233 |
| 2022/0180809 A1* | 6/2022 | Wang | G09G 3/3233 |
| 2025/0221187 A1* | 7/2025 | Chi | G09G 3/006 |

FOREIGN PATENT DOCUMENTS

KR 10-2285390 B1 7/2021

* cited by examiner

*Primary Examiner* — Kevin M Nguyen
(74) *Attorney, Agent, or Firm* — Birch, Stewart, Kolasch & Birch, LLP

(57) ABSTRACT

A display apparatus in an example includes a plurality of pixels, a dummy pixel for repairing a defective pixel, and a repair wiring. The dummy pixel includes a dummy driving transistor configured to drive the defective pixel, a dummy compensation capacitor connected between a source electrode of the dummy driving transistor and a DC voltage, and a dummy transistor configured to supply a dummy reset voltage to a dummy reset node. The dummy reset voltage varies with a data voltage.

19 Claims, 13 Drawing Sheets

DISPLAY APPARATUS

CROSS-REFERENCE TO RELATED APPLICATION

The present application claims priority to Korean Patent Application No. 10-2024-0189771, filed in the Republic of Korea on Dec. 18, 2024, the entire contents of which is expressly incorporated by reference into the present application.

BACKGROUND

Technical Field

This disclosure relates to a display apparatus, and more particularly, to a repairable display apparatus.

Discussion of the Related Art

An organic light-emitting display apparatus is a self-emissive display device that, unlike a liquid crystal display, needs no separate light source, enabling lightweight and thin manufacturing. Additionally, an organic light-emitting display apparatus offers advantages in power consumption due to low-voltage driving and excels in color reproduction, response speed, viewing angle, and contrast ratio (CR), positioning it as a next-generation display under research.

Display apparatuses are continuously improved to enhance screen resolution and luminance, delivering clearer images to users.

SUMMARY OF THE DISCLOSURE

A display apparatus can include a light-emitting element and a pixel driving circuit that drives the light-emitting element. The pixel driving circuit includes a thin-film transistor and a capacitor. In some situations, defects can occur in the pixel driving circuit, such as in the thin-film transistor or capacitor. Further, a light-emitting element connected to a defective pixel driving circuit can cause dark spot or bright spot defects.

Pixel defects due to a defective pixel driving circuit can be difficult to trace to their exact origin. Thus, repairing pixel defects which can be caused by defects in the pixel driving circuit can be challenging.

To address this and other limitations associated with the related art, the inventor of this disclosure has developed a display apparatus capable of repairing such defects when a pixel defect occurs due to a defect in the pixel driving circuit.

An objective of one or more embodiments of this disclosure is to provide a display apparatus capable of repairing defective pixels which can be caused by defects in the pixel driving circuit.

The objectives of one or more embodiments of this disclosure are not limited to those mentioned above, and other objectives not mentioned will be clearly understood by those skilled in the art from the detailed description.

A display apparatus according to one or more embodiments of this disclosure includes a dummy pixel for repairing a defective pixel, where the dummy pixel includes a dummy driving transistor configured to drive the defective pixel, a dummy compensation capacitor connected between a source electrode of the dummy driving transistor and a DC voltage, and a dummy transistor configured to supply a dummy reset voltage, which varies with a data voltage, to a dummy reset node.

According to one or more embodiments of this disclosure, the dummy compensation capacitor can have a larger capacitance than a compensation capacitor of a normal pixel.

According to one or more embodiments of this disclosure, the dummy driving transistor can have a larger channel width or a smaller channel length than a driving transistor of a normal pixel.

According to one or more embodiments of this disclosure, a dummy storage capacitor provided in the dummy pixel can have a smaller capacitance than a storage capacitor of a normal pixel.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
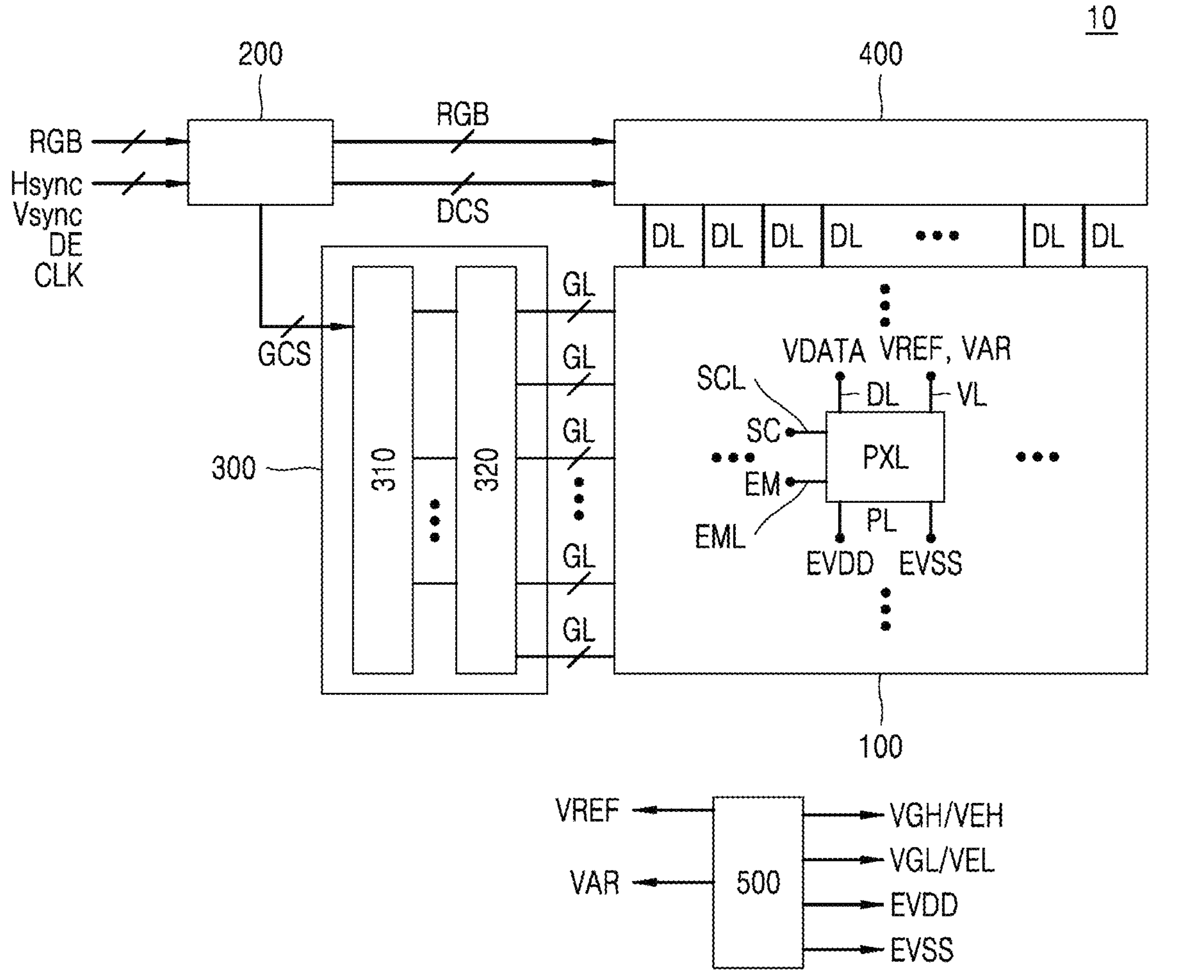
FIG. 1 is a block diagram schematically illustrating an organic light-emitting display apparatus according to one or more embodiments of this disclosure.

Advantages and features disclosed in this specification and methods of accomplishing the same can be understood more readily by reference to the detailed description of embodiments that will be made hereinafter with reference to the accompanying drawings. However, this specification is not limited to the embodiments disclosed below and can be implemented in various different forms; these embodiments are provided merely to ensure that the disclosure of this specification is complete and to fully inform those of ordinary skill in the art of the scope of the invention.

The shapes, sizes, ratios, angles, numbers and the like illustrated in the drawings to describe embodiments of the disclosure are merely exemplary, and thus, the disclosure is not limited thereto. Throughout the specification, the same reference numerals refer to the same components. In addition, detailed descriptions of well-known technologies can be omitted in the specification to avoid obscuring the subject matter of the disclosure. When terms such as "comprises," "has," "includes," or "is made up of" are used in this specification, it should be understood that unless "only" is specifically used, additional elements or steps can be included. Unless otherwise explicitly stated, when a component is expressed in the singular form, it is intended to encompass the plural form as well.

In interpreting the components, it is construed to include a margin of error even in the absence of explicit description.

In the case of describing positional relationships, for example, when the positional relationship between two components is described using terms such as "on,' "on top of," "below," or "beside," one or more other components can be positioned between the two components unless "directly" or "immediately" is specified.

When describing temporal relationships, expressions such as "after," "following," "next," or "before" can indicate a sequence of events, and unless "immediately" or "directly" is used, non-continuous cases can also be included.

When describing a signal flow relationship, for example, in the case of "a signal is transmitted from node A to node B," instances where the signal is transmitted from node A to node B via another node can also be included unless "immediately" or "directly" is specified.

Terms like "first," "second," etc., are used to describe various components, but these components are not limited by these terms. These terms are merely used for distinguishing one component from the other components and may not define order or sequence. Therefore, the first component mentioned hereinafter can be the second component in the technical sense of this specification. Further, the term "can" fully encompasses all the meanings and coverages of the term "may" and vice versa.

The various features of the embodiments of the disclosure can combined or assembled together, either partially or entirely, in a technically diverse manner, and each embodiment can be independently implemented or in conjunction with related embodiments.

In describing the embodiments of the disclosure, descriptions of components identical or corresponding to those in the previous embodiment will be omitted. Hereinafter, a display apparatus capable of repairing defective pixels which can be caused by defects in the pixel driving circuit according to various embodiments of this disclosure will be described. All the components of each display apparatus according to all embodiments of this disclosure are operatively coupled and configured.

Various embodiments of this disclosure will now be described in detail with reference to the accompanying drawings.

FIG. 1 is a block diagram schematically illustrating an organic light-emitting display apparatus according to one or more embodiments of this disclosure.

Referring to FIG. 1, a display apparatus 10 includes a display panel 100 comprising a plurality of pixels PXL, a controller 200, a gate driver 300 for supplying scan signals SC to the plurality of pixels PXL, a data driver 400 for supplying data voltages VDATA to the plurality of pixels PXL, and a power supply 500 for providing voltages for driving the plurality of pixels PXL.

In the display panel 100, a plurality of gate lines GL and a plurality of data lines DL intersect each other, and each of the plurality of pixels PXL is connected to a gate line GL and a data line DL. Specifically, one pixel PXL receives a gate signal from the gate driver 300 via a gate line GL, a data signal from the data driver 400 via a data line DL, and a high-potential driving voltage EVDD and a low-potential driving voltage EVSS from the power supply 500.

The gate line GL supplies a scan signal SC and an emission control signal EM, and the data line DL supplies a data voltage VDATA. Additionally, depending on various embodiments, the gate line GL can include a plurality of scan lines SCL supplying scan signals SC and an emission control signal line EML supplying emission control signals EM. Further, the plurality of pixels PXL can additionally include a power line VL to receive a reference voltage VREF and an anode reset voltage VAR.

Moreover, each pixel PXL includes a light-emitting element and a pixel driving circuit. The pixel driving circuit includes a plurality of switching elements, a driving element, and a capacitor. Here, the switching elements and driving element can be composed of thin-film transistors. In the pixel driving circuit, the driving element controls the current supplied to the light-emitting element based on the data voltage, thereby adjusting the light emission amount of the light-emitting element. Additionally, the plurality of switching elements receive a scan signal SC supplied via the plurality of scan lines SCL and an emission control signal EM supplied via the emission control line EML to operate the pixel driving circuit.

The display panel 100 can be implemented as a non-transmissive display panel or a transmissive display panel. A transmissive display panel can be applied to a transparent display device where an image is displayed on the screen and real objects in the background are visible. The display panel 100 can be fabricated as a flexible display panel. A flexible display panel can be implemented as an OLED panel using a plastic substrate.

Touch sensors can be disposed on the display panel 100. Touch input can be sensed using separate touch sensors or through the pixels PXL. The touch sensors can be implemented as on-cell type or add-on type touch sensors disposed on the screen of the display panel, or as in-cell type touch sensors embedded in the display panel 100.

The controller 200 processes image data RGB input from an external source to match the size and resolution of the display panel 100 and supplies it to the data driver 400. The controller 200 generates a gate control signal GCS and a data control signal DCS using synchronization signals input from an external source, such as a clock signal CLK, a data enable signal DE, a horizontal synchronization signal Hsync, and a vertical synchronization signal Vsync. The controller 200 supplies the gate control signal GCS and the data control signal DCS to the gate driver 300 and the data driver 400, respectively, thereby controlling the gate driver 300 and the data driver 400.

The controller 200 can be combined with various processors, such as a microprocessor, a mobile processor, or an application processor, depending on the device in which it is implemented.

The host system can be any one of a TV system, a set-top box, a navigation system, a personal computer PC, a home theater system, a mobile device, a wearable device, or a vehicle system.

The controller 200 can control the operation timing of the gate driver 300 and the data driver 400 at a frame frequency of input frame frequency x i (where i is a positive integer greater than 0) Hz by multiplying the input frame frequency by i. The input frame frequency is 60 Hz in the NTSC (National Television Standards Committee) system and 50 Hz in the PAL (Phase-Alternating Line) system.

The controller 200 generates signals to enable the pixel PXL to be driven at various refresh rates. The refresh rate can be defined as the number of frames transmitted per second. For example, the controller 200 generates signals related to driving such that the pixel PXL can be driven at a variable refresh rate when operating in a Variable Refresh Rate VRR mode, allowing switching to different refresh rates. For example, the controller 200 can simply change the speed of the clock signal or generate a synchronization signal to include a horizontal blank or vertical blank.

Based on timing signals Vsync, Hsync, and DE received from the host system, the controller 200 generates a gate control signal GCS to control the operation timing of the gate driver 300 and a data control signal DCS to control the operation timing of the data driver 400. The controller 200 synchronizes the gate driver 300 and the data driver 400 by controlling their operation timing.

The voltage level of the gate control signal GCS output from the controller 200 can be converted into a gate-on voltage VGL, VEL and a gate-off voltage VGH, VEH through a level shifter and supplied to the gate driver 300. The level shifter converts a low-level voltage of the gate control signal GCS into a gate low voltage VGL and a high-level voltage of the gate control signal GCS into a gate high voltage VGH. The gate control signal GCS includes a start pulse and a shift clock.

The gate driver 300 supplies scan signals SC to the gate line GL in response to the gate control signal GCS supplied from the controller 200. The gate driver 300 can be disposed on one side or both sides of the display panel 100 using a Gate In Panel GIP configuration.

The gate driver 300 sequentially outputs gate signals to the plurality of gate lines GL under the control of the controller 200. The gate driver 300 can sequentially supply the gate signals to the gate lines GL by shifting the gate signals using a shift register.

The gate signal can include a scan signal SC and an emission control signal EM in an organic light-emitting display apparatus. The scan signal SC includes a scan pulse that swings between a gate-on voltage VGL and a gate-off voltage VGH. The emission control signal EM can include an emission control signal pulse that swings between a gate-on voltage VEL and a gate-off voltage VEH. The scan pulse, synchronized with the data voltage VDATA, is used to select the pixels PXL of the line where data is to be written. The emission control signal pulse defines the emission time of the pixels PXL.

The gate driver 300 includes an emission control signal driver 310 and at least one scan driver 320. The emission control signal driver 310 outputs an emission control signal pulse in response to a start pulse and a shift clock from the controller 200 and sequentially shifts the emission control signal pulse according to the shift clock. The scan driver 320 outputs a scan pulse in response to a start pulse and a shift clock from the controller 200 and shifts the scan pulse in accordance with the shift clock timing.

The data driver 400 converts image data RGB into a data voltage VDATA in response to the data control signal DCS supplied from the controller 200 and supplies the converted data voltage VDATA to the pixels PXL through the data line DL.

In FIG. 1, the data driver 400 is illustrated as being disposed on one side of the display panel 100 in a single form, but the number and arrangement position of the data driver 400 are not limited thereto. The data driver 400 can be composed of a plurality of integrated circuits IC arranged separately on one side of the display panel 100.

The power supply 500 uses a DC-DC converter to generate the DC power for driving the pixel array of the display panel 100, the gate driver 300, and the data driver 400. The DC-DC converter can include a charge pump, a regulator, a buck converter, a boost converter, and the like. The power supply 500 receives a DC input voltage from the host system and generates DC voltages such as a gate-off voltage VGL, VEL, a gate-on voltage VGH, VEH, a high-potential driving voltage EVDD, and a low-potential driving voltage EVSS. The gate-off voltage VGL, VEL and the gate-on voltage VGH, VEH are supplied to the level shifter and the gate driver 300. The high-potential driving voltage EVDD and the low-potential driving voltage EVSS are supplied to the pixels PXL.

Additionally, the power supply 500 can generate DC voltages such as a reference voltage VREF and an anode reset voltage VAR. The reference voltage VREF and the anode reset voltage VAR are supplied to the pixel PXL through the power line VL. Here, the power line VL can include a reference voltage bus line and an anode reset voltage bus line.

Figure 2:
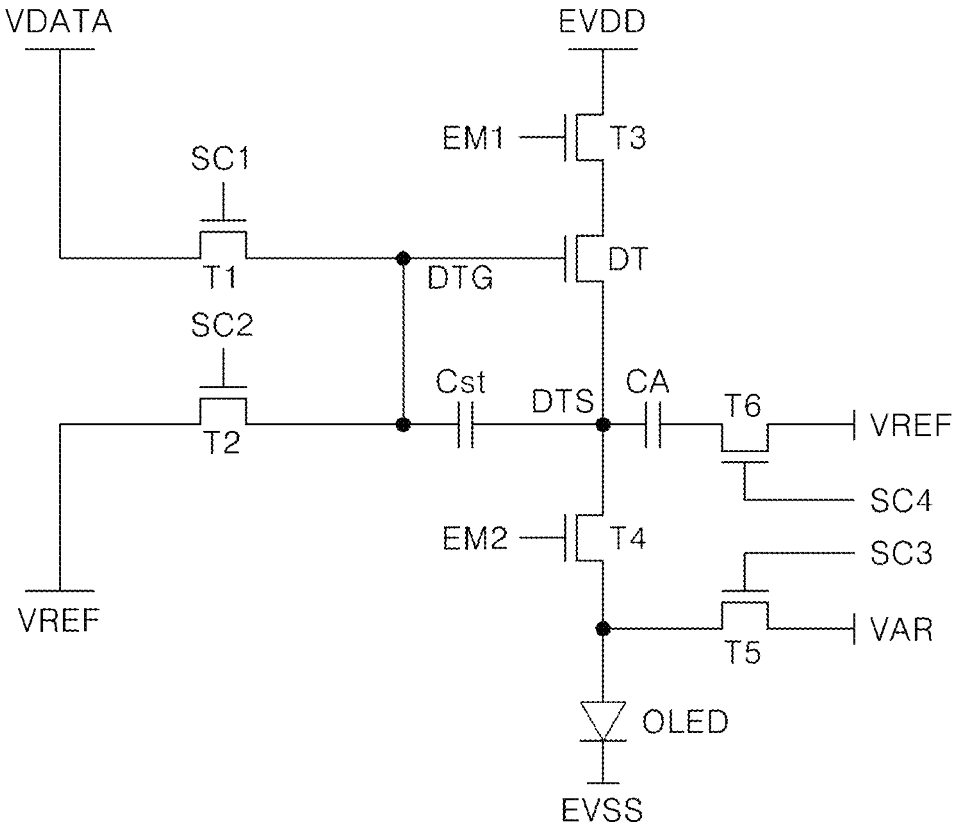
FIG. 2 is a circuit diagram of a pixel in an organic light-emitting display apparatus according to an embodiment of this disclosure.

FIG. 2 is a circuit diagram of a pixel in an organic light-emitting display apparatus according to an embodiment of this disclosure.

Referring to FIG. 2, each of the plurality of pixels PXL includes a light-emitting element OLED and a pixel driving circuit that drives the light-emitting element OLED. The pixel driving circuit includes a driving transistor DT, first to sixth transistors T1 to T6, a storage capacitor Cst, and a compensation capacitor CA.

Each of the driving transistor DT and the first to sixth transistors T1 to T6 can include a first electrode, a second electrode, and a gate electrode. One of the first and second electrodes can be a source electrode, and the other can be a drain electrode.

Each of the driving transistor DT and the first to sixth transistors T1 to T6 can be a P-type thin-film transistor or an N-type thin-film transistor. For example, the driving transistor DT and the first to sixth transistors T1, T2, T3, T4, T5, and T6 can be N-type thin-film transistors. Alternatively, for example, the driving transistor DT and the first, second, fourth, fifth, and sixth transistors T1, T2, T4, T5, and T6 can be N-type thin-film transistors, and the third transistor can be a P-type transistor.

According to one or more embodiments of this disclosure, the first transistor T1 is a transistor supplying a data voltage VDATA, the second transistor T2 is a transistor initializing the gate electrode of the storage capacitor Cst and the driving transistor DT, the third transistor T3 is a transistor supplying a high-potential driving voltage EVDD, the fourth transistor T4 is a transistor controlling the emission time of the light-emitting element OLED, the fifth transistor T5 is a transistor resetting the anode electrode of the light-emitting element OLED, and the sixth transistor T6 is a transistor supplying a DC voltage to the compensation capacitor CA to compensate for characteristics of the driving transistor DT, such as threshold voltage and mobility.

The light-emitting element OLED includes an anode electrode, a light-emitting layer, and a cathode electrode. For example, the light-emitting layer can be an organic or inorganic light-emitting layer. The anode electrode of the light-emitting element OLED is connected to the source electrode of the driving transistor DT through the fourth transistor T4, and the cathode electrode is connected to the low-potential driving voltage EVSS.

The driving transistor DT includes a drain electrode DTD connected to the third transistor T3, a gate electrode DTG, and a source electrode DTS. The driving transistor DT controls the driving current to emit light from the light-emitting element OLED based on the voltage of the gate electrode DTG, for example, the data voltage VDATA sampled by the storage capacitor Cst.

The first transistor T1 includes a first electrode connected to the data voltage VDATA, a second electrode connected to the gate electrode of the driving transistor DT, and a gate electrode receiving a first scan signal SC1. The first transistor T1 turns on in response to the first scan signal SC1 and can transfer the data voltage VDATA to the gate electrode DTG.

The storage capacitor Cst can have one electrode connected to the gate electrode DTG to which the data voltage VDATA is applied and the other electrode connected to the source electrode DTS of the driving transistor DT. The storage capacitor Cst can sample the threshold voltage of the driving transistor DT or the data voltage VDATA according to the operation of the pixel driving circuit.

The second transistor T2 includes a first electrode receiving a reference voltage VREF, a second electrode connected to the gate electrode DTG of the driving transistor DT and the storage capacitor Cst, and a gate electrode receiving a second scan signal SC2. The second transistor T2 can supply the reference voltage VREF to the gate electrode DTG of the driving transistor DT and one electrode of the storage capacitor Cst in response to the second scan signal SC2.

The third transistor T3 can include a first electrode receiving a high-potential driving voltage EVDD, a second electrode connected to the drain electrode of the driving transistor DT, and a gate electrode receiving a first emission control signal EM1. The third transistor T3 can supply the high-potential driving voltage EVDD to the drain electrode of the driving transistor DT in response to the first emission control signal EM1. Additionally, the third transistor T3 can control the turn-on time of the light-emitting element OLED by adjusting the pulse width of the first emission control signal EM1.

The fourth transistor T4 can include a first electrode connected to the source electrode of the driving transistor DT, a second electrode connected to the anode electrode of the light-emitting element OLED, and a gate electrode receiving a second emission control signal EM2. The fourth transistor T4 can supply the driving current controlled by the driving transistor DT to the anode electrode of the light-emitting element OLED in response to the second emission control signal EM2. Additionally, the fourth transistor T4 can control the turn-on time of the light-emitting element OLED by adjusting the pulse width of the second emission control signal EM2.

The fifth transistor T5 can include a first electrode receiving an anode reset voltage VAR, a second electrode connected to the anode electrode of the light-emitting element OLED, and a gate electrode receiving a third scan signal SC3. The fifth transistor T5 can supply the anode reset voltage VAR to the anode electrode of the light-emitting element OLED in response to the third scan signal SC3.

The sixth transistor T6 can include a first electrode connected to the reference voltage VREF, a second electrode connected to the compensation capacitor CA, and a gate electrode receiving a fourth scan signal SC4. The sixth transistor T6 can supply the reference voltage VREF to the compensation capacitor CA. In FIG. 2, the reference voltage VREF is illustrated, but it is not limited thereto, and a high-potential driving voltage EVDD can be supplied. Alternatively, another DC voltage can be supplied to the compensation capacitor CA.

The compensation capacitor CA can have one electrode connected to the source electrode of the driving transistor DT and the storage capacitor Cst, and the other electrode connected to the sixth transistor T6. The compensation capacitor CA can receive the reference voltage VREF through the sixth transistor T6 during a period compensating for electrical characteristics of the driving transistor, such as the threshold voltage and mobility. Alternatively, the compensation capacitor CA can be directly connected to a DC voltage, such as the reference voltage VREF, to receive the DC voltage.

The display apparatus can operate as a VRR mode display apparatus. The VRR mode drives at a constant frequency and increases the refresh rate at which the data voltage VDATA is updated to operate the pixel when high-speed driving is needed, or reduces the refresh rate to operate the pixel when low power consumption or low-speed driving is needed.

The pixel driving circuit can be driven through a combination of a refresh frame and an anode reset frame. In this disclosure, a refresh frame can be defined as a period during which the data voltage VDATA is updated, and an anode reset frame can be defined as a period during which the data voltage VDATA is not updated. One frame can be driven solely by a refresh frame according to the refresh rate or by alternating refresh frames and anode reset frames.

For example, driving at a refresh rate of 120 Hz can involve only refresh frames. Driving at a refresh rate of 60 Hz can involve alternating refresh frames and anode reset frames. Driving at a refresh rate of 1 Hz can involve one frame consisting of one refresh frame followed by 119 anode reset frames. Additionally, driving at a refresh rate of 1 Hz can involve one frame consisting of a plurality of refresh frames and a plurality of anode reset frames.

The refresh frame charges a new data voltage VDATA, applying it to the driving transistor DT, whereas the anode reset frame maintains the data voltage VDATA from the previous frame. The anode reset frame can be named a skip or hold period, meaning the process of applying a new data voltage VDATA to the driving transistor DT is omitted.

The pixel driving circuit can eliminate the influence of the data voltage VDATA stored in the previous frame by initializing the gate electrode of the driving transistor DT and the storage capacitor Cst during the refresh frame. Additionally, the pixel driving circuit can eliminate the influence of leakage current by resetting the charge remaining on the anode electrode of the light-emitting element OLED during the refresh frame.

Figure 3:
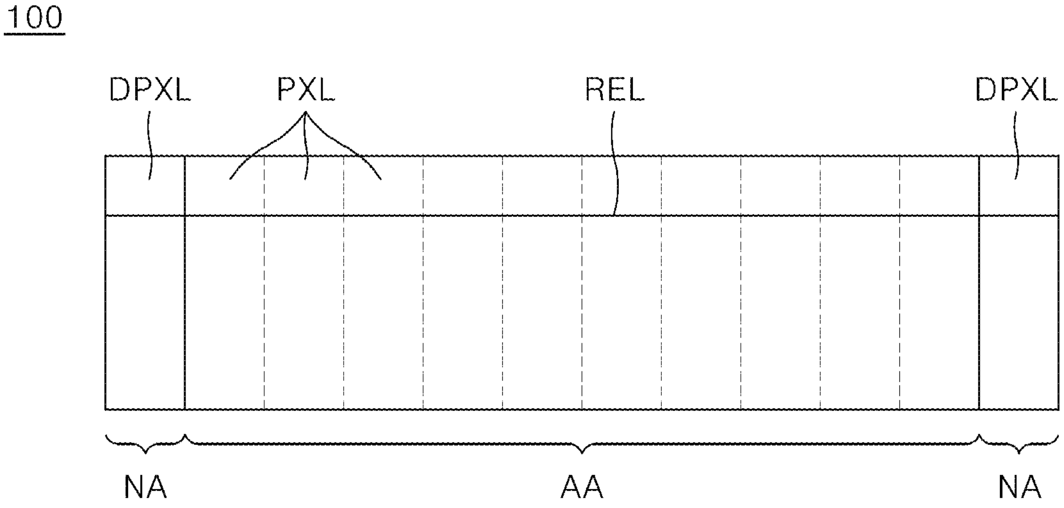
FIG. 3 is a schematic block diagram of a display panel in an organic light-emitting display apparatus according to an embodiment of this disclosure.
Figure 4:
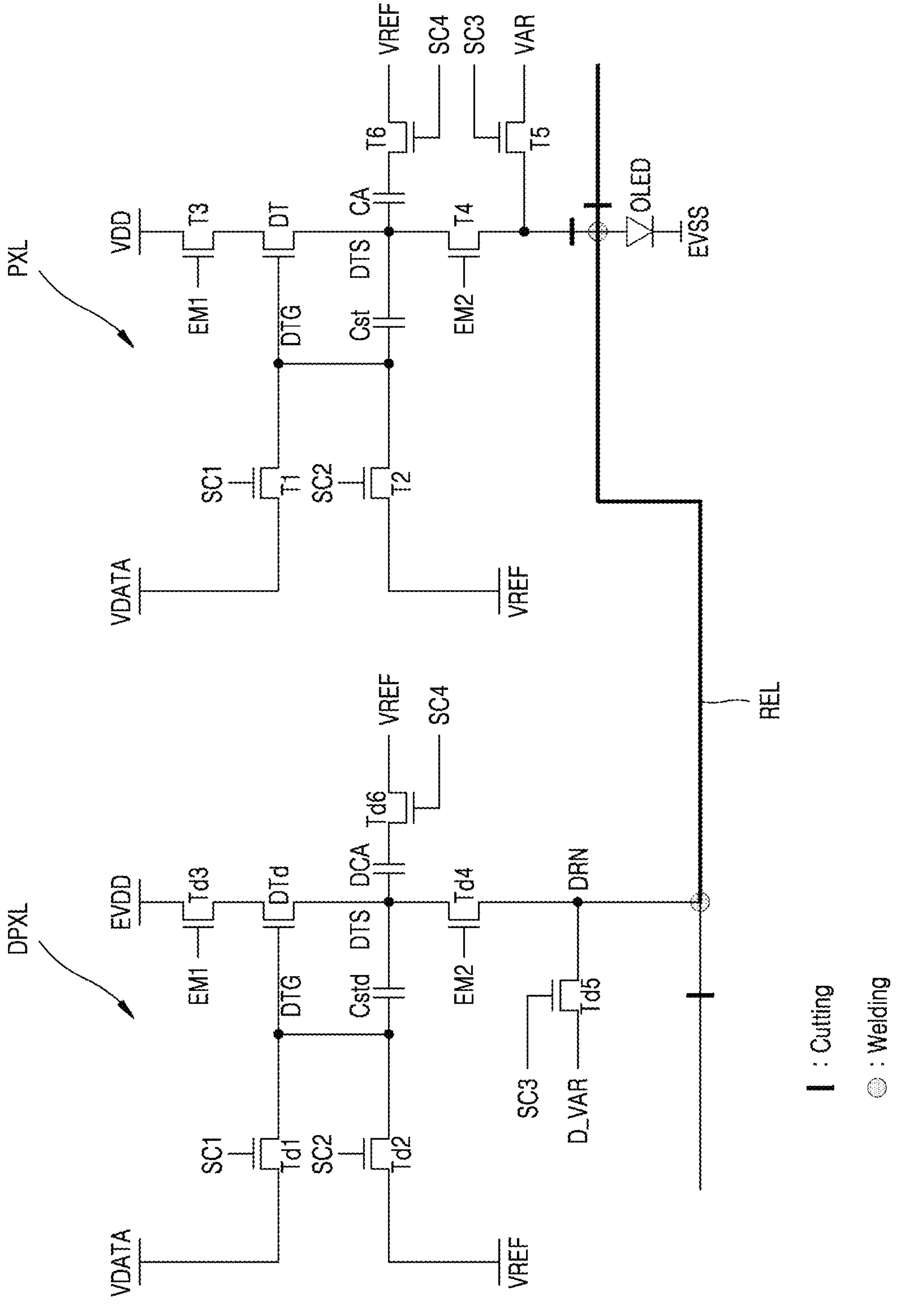
FIG. 4 is a circuit diagram illustrating a defective pixel connected to a dummy pixel for repair in an organic light-emitting display apparatus according to an embodiment of this disclosure.
Figure 5:
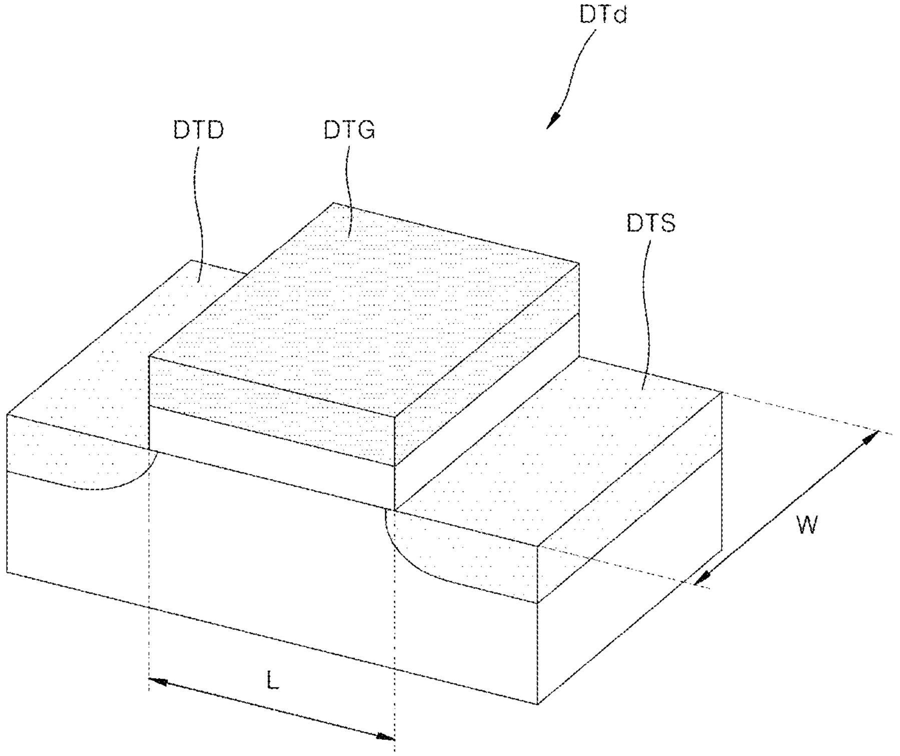
FIG. 5 is a diagram illustrating the channel width and length of the dummy driving transistor of FIG. 4.

FIG. 3 is a schematic block diagram of a display panel in an organic light-emitting display apparatus according to an embodiment of this disclosure. FIG. 4 is a circuit diagram illustrating a defective pixel connected to a dummy pixel for repair in an organic light-emitting display apparatus according to an embodiment of this disclosure. FIG. 5 is a diagram illustrating the channel width and length of the dummy driving transistor of FIG. 4.

Referring to FIGS. 3 and 4, the display panel includes an active area AA where a plurality of pixels PXL are disposed and a non-display area NA where dummy pixels DPXL are disposed on both sides of the active area AA. Additionally, the display panel includes a repair wiring REL formed to overlap with a plurality of pixels arranged in a first direction.

In the case where a defect occurs in any one of the plurality of pixels PXL disposed in the active area AA of the display panel, the node between the pixel driving circuit the defective pixel and the anode electrode of the light-emitting element OLED of the defective pixel is cut by a laser, the anode electrode of the light-emitting element OLED of the defective pixel is connected to the repair wiring REL through welding, and the dummy reset node DRN of the pixel driving circuit of the dummy pixel DPXL is connected to the repair wiring REL through welding. In this disclosure, the dummy reset node DRN can be defined as a node connected to the repair wiring REL during the repair of a defective pixel.

The dummy pixel DPXL includes a dummy driving transistor DTd, a dummy storage capacitor Cstd, first to sixth dummy transistors Td1, Td2, Td3, Td4, Td5, and Td6, and a dummy compensation capacitor DCA.

Each of the dummy driving transistor DTd and the first to sixth dummy transistors Td1, Td2, Td3, Td4, Td5, and Td6 can include a first electrode, a second electrode, and a gate electrode. One of the first and second electrodes can be a source electrode, and the other can be a drain electrode.

Each of the dummy driving transistor DTd and the first to sixth dummy transistors Td1, Td2, Td3, Td4, Td5, and Td6 can be a P-type thin-film transistor or an N-type thin-film transistor. For example, the dummy driving transistor DTd and the first to sixth dummy transistors Td1, Td2, Td3, Td4, Td5, and Td6 can be N-type thin-film transistors. Alternatively, the dummy driving transistor DTd and the first, second, fourth, fifth, and sixth dummy transistors Td1, Td2, Td4, Td5, and Td6 can be N-type thin-film transistors, and the third dummy transistor Td3 can be a P-type thin-film transistor.

The dummy driving transistor DTd is used to drive the light-emitting element OLED of a defective pixel in the active area AA electrically connected through the repair wiring REL. In this case, the anode electrode of the light-emitting element OLED of the defective pixel is connected to the repair wiring REL, and the dummy reset node DRN of the pixel driving circuit of the dummy pixel DPXL is connected to the repair wiring REL.

FIG. 5 illustrates the channel width W and length L of the dummy driving transistor DTd of the dummy pixel DPXL.

Referring to FIG. 5, the dummy driving transistor DTd of the dummy pixel DPXL can be designed to have a larger channel width W than the driving transistor DT of the pixel PXL. Additionally, the dummy driving transistor DTd of the dummy pixel DPXL can be designed to have a smaller channel length L than the driving transistor DT of the pixel PXL. Furthermore, the dummy driving transistor DTd of the dummy pixel DPXL can be designed to have a larger channel width W and a smaller channel length L than the driving transistor DT of the pixel PXL.

For example, the width W of the drain electrode DTD and source electrode DTS of the dummy driving transistor DTd can be formed larger than that of the driving transistor of the pixel in the active area AA. Additionally, the length L between the drain electrode DTD and the source electrode DTS of the dummy driving transistor DTd can be formed shorter than that of the driving transistor of the pixel in the active area AA.

For example, the dummy driving transistor DTd of the dummy pixel DPXL can be designed to have greater driving performance than the driving transistor PXL of the pixel PXL provided in the active area AA.

The display apparatus designed in this way allows the dummy driving transistor DTd of the dummy pixel DPXL to have a larger channel width W or a smaller channel length L than the driving transistor DT of the pixel PXL, enabling the driving of the light-emitting element OLED of a defective pixel even if the defective pixel occurs in the center of the active area AA.

Additionally, the display apparatus is designed such that the dummy driving transistor DTd of the dummy pixel DPXL has greater driving performance than the pixel PXL of the active area AA, thereby reducing the difference in luminance characteristics between the normal pixel PXL and the dummy pixel DPXL based on the high-gray data voltage VDATA.

The first dummy transistor Td1 includes a first electrode connected to the data voltage VDATA, a second electrode connected to the gate electrode DTG of the dummy driving transistor DTd, and a gate electrode receiving a first scan signal SC1. The first dummy transistor Td1 turns on in response to the first scan signal SC1 and supplies the data voltage VDATA to the gate electrode DTG of the dummy driving transistor DTd.

The dummy storage capacitor Cstd has one electrode connected to the gate electrode DTG of the dummy driving transistor DTd to which the data voltage VDATA is applied and the other electrode connected to the source electrode DTS of the dummy driving transistor DTd. The dummy storage capacitor Cstd can sample the threshold voltage of the dummy driving transistor DTd or the data voltage VDATA according to the operation of the pixel driving circuit.

The dummy storage capacitor Cstd of the dummy pixel DPXL can be designed to have a smaller capacitance than the storage capacitor Cst provided in the pixel PXL of the active area AA.

The display apparatus is designed such that the dummy storage capacitor Cstd of the dummy pixel DPXL has a smaller capacitance than the pixel PXL of the active area AA, thereby reducing the difference in luminance characteristics between the normal pixel PXL and the dummy pixel DPXL based on the high-gray data voltage VDATA.

The second dummy transistor Td2 can include a first electrode receiving a reference voltage VREF, a second electrode connected to the gate electrode DTG of the dummy driving transistor DTd and the dummy storage capacitor Cstd, and a gate electrode receiving a second scan signal SC2. The second dummy transistor Td2 can supply the reference voltage VREF to the gate electrode of the dummy driving transistor DTd and one electrode of the dummy storage capacitor Cstd in response to the second scan signal SC2. The second dummy transistor Td2 can supply the reference voltage VREF during an initialization period to initialize the gate electrode of the dummy driving transistor DTd and the dummy storage capacitor Cstd.

The third dummy transistor Td3 can include a first electrode receiving a high-potential driving voltage EVDD, a second electrode connected to the drain electrode of the dummy driving transistor DTd, and a gate electrode receiving a first emission control signal EM1. The third dummy transistor Td3 can supply the high-potential driving voltage EVDD to the drain electrode of the dummy driving transistor DTd in response to the first emission control signal EM1. Additionally, the third dummy transistor Td3 can control the turn-on time of the light-emitting element OLED of the normal pixel PXL by adjusting the pulse width of the first emission control signal EM1.

The fourth dummy transistor Td4 can include a first electrode connected to the source electrode of the dummy driving transistor DTd, a second electrode connected to the anode electrode of the light-emitting element OLED of the defective pixel PXL through the repair wiring REL, and a gate electrode receiving a second emission control signal EM2. The fourth dummy transistor Td4 can supply the driving current controlled by the dummy driving transistor DTd to the anode electrode of the light-emitting element OLED in response to the second emission control signal EM2. Additionally, the fourth dummy transistor Td4 can control the turn-on time of the light-emitting element OLED by adjusting the pulse width of the second emission control signal EM2.

The fifth dummy transistor Td5 can include a first electrode receiving a dummy reset voltage D_VAR, a second electrode connected to the anode electrode of the light-emitting element OLED of the defective pixel PXL through the repair wiring REL, and a gate electrode receiving a third scan signal SC3. The fifth dummy transistor Td5 can supply the dummy reset voltage D_VAR to the anode electrode of the light-emitting element OLED in response to the third scan signal SC3.

The dummy reset voltage D_VAR of the dummy pixel DPXL can be designed to vary in conjunction with the data voltage VDATA, unlike the pixel AA of the active area AA. For example, the anode reset voltage VAR applied to the pixel AA of the active area AA can have a fixed value, and the dummy reset voltage D_VAR of the dummy pixel DPXL can vary proportionally to the data voltage VDATA.

The display apparatus is designed such that the dummy reset voltage D_VAR of the dummy pixel DPXL varies proportionally to the data voltage VDATA, thereby reducing the difference in luminance characteristics between the dummy pixel DPXL and the normal pixel based on the low-luminance data voltage VDATA The sixth dummy transistor Td6 includes a first electrode connected to the reference voltage VREF, a second electrode connected to the dummy compensation capacitor DCA, and a gate electrode receiving a fourth scan signal SC4. The sixth dummy transistor Td6 supplies the reference voltage VREF to the dummy compensation capacitor DCA. The sixth dummy transistor Td6 can be activated during a period compensating for electrical characteristics of the dummy driving transistor DTd, such as threshold voltage and mobility.

The dummy compensation capacitor DCA can have one electrode connected to the source electrode of the dummy driving transistor DTd. Additionally, the dummy compensation capacitor DCA can have one electrode connected to the other electrode of the dummy storage capacitor Cstd. Furthermore, the dummy compensation capacitor DCA can have the other electrode connected to the second electrode of the sixth dummy transistor Td6.

The dummy compensation capacitor DCA can receive the reference voltage VREF through the sixth dummy transistor Td6. Alternatively, the dummy compensation capacitor DCA can receive the high-potential driving voltage EVDD through the sixth dummy transistor Td6. Alternatively, the other electrode of the dummy compensation capacitor DCA can be directly connected to the reference voltage VREF. Alternatively, the other electrode of the dummy compensation capacitor DCA can be directly connected to the high-potential driving voltage EVDD.

The dummy compensation capacitor DCA of the dummy pixel DPXL can be designed to have a larger capacitance than the compensation capacitor CA of the pixel PXL in the active area. Increasing the capacitance of the dummy compensation capacitor DCA can reduce the data voltage requiring compensation.

The display apparatus is designed such that the dummy compensation capacitor DCA of the dummy pixel DPXL has a larger capacitance than the compensation capacitor CA of the pixel PXL in the active area, thereby reducing the difference in luminance characteristics between the dummy pixel DPXL and the normal pixel based on the high-gray data voltage VDATA.

The display apparatus can reduce the difference in luminance characteristics between the dummy pixel DPXL and the normal pixel based on the high-gray data voltage VDATA, allowing additional compensation within the driving range of the data driver.

Figure 6:
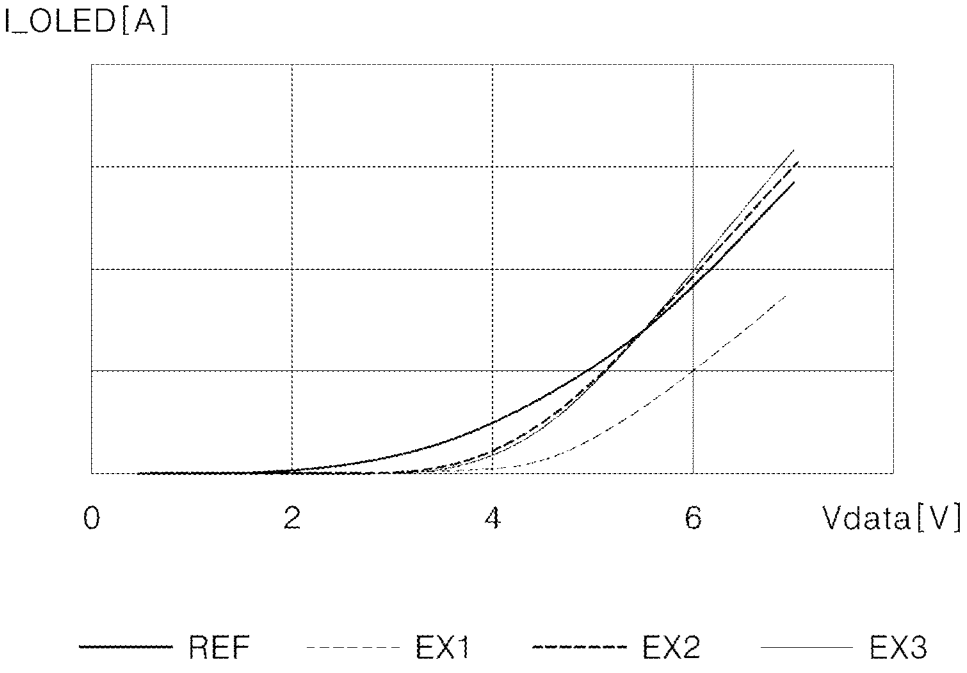
FIGS. 6 and 7 are graphs illustrating simulation results of defective pixel repair in an organic light-emitting display apparatus according to some embodiments of this disclosure.
Figure 7:
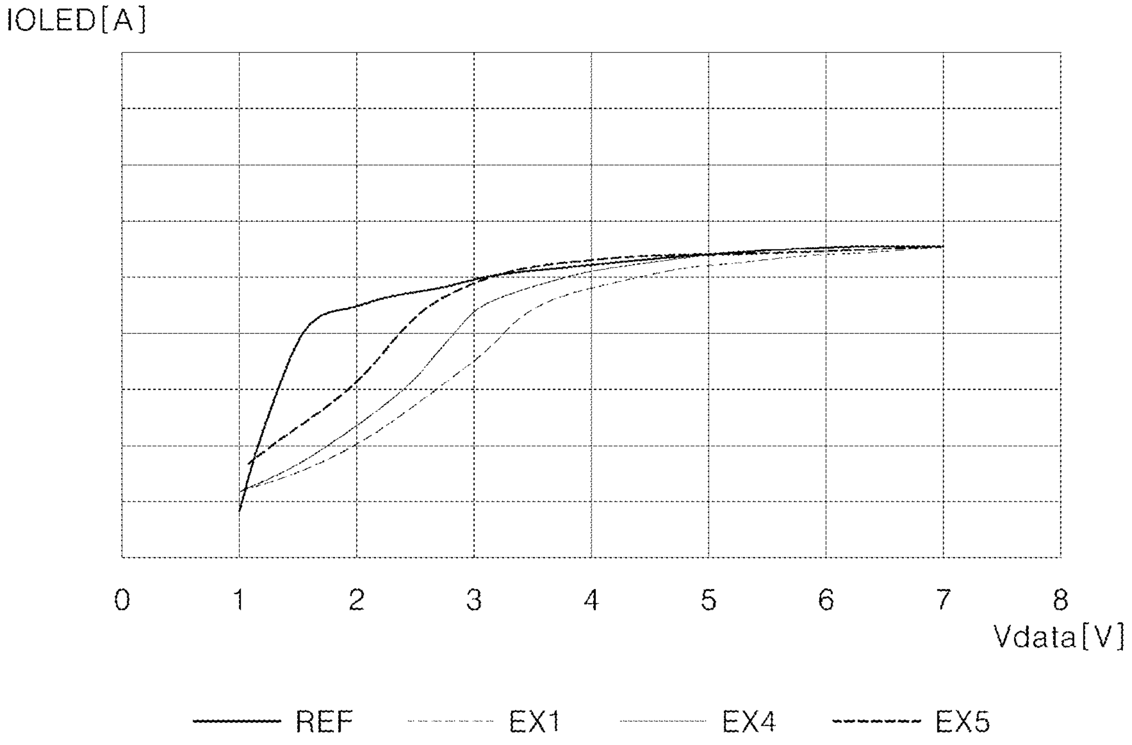
Figure 8:
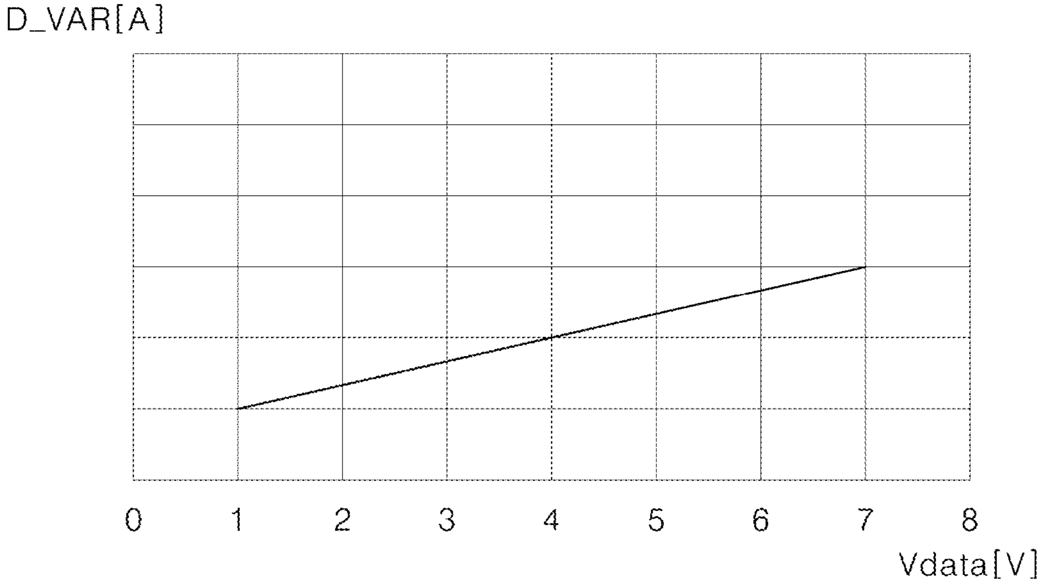
FIG. 8 is a graph illustrating the relationship of a dummy reset voltage varying with a data voltage in the organic light-emitting display apparatus of FIG. 4.

FIGS. 6 and 7 are graphs illustrating simulation results of defective pixel repair in an organic light-emitting display apparatus according to some embodiments of the disclosure. FIG. 8 is a graph illustrating the relationship of a dummy reset voltage varying with a data voltage in the organic light-emitting display apparatus of FIG. 4.

In FIG. 6, REF represents the luminance characteristics of a normal pixel according to a high-gray data voltage. For example, it represents the driving current I_OLED according to a high-gray data voltage. EX1 represents the luminance characteristics of a dummy pixel with a pixel driving circuit identical to a normal pixel according to a high-gray data voltage. EX2 represents the luminance characteristics of a dummy pixel with a dummy compensation capacitor having a larger capacitance than a normal pixel according to a high-gray data voltage. Alternatively, EX2 represents the luminance characteristics of a dummy pixel with a dummy driving transistor having a larger channel width or a smaller channel length than a normal pixel according to a high-gray data voltage. EX3 represents the luminance characteristics of a dummy pixel with a dummy storage capacitor having a smaller capacitance than a normal pixel according to a high-gray data voltage.

Referring to FIG. 6, increasing the capacitance of the dummy compensation capacitor in the dummy pixel compared to the normal pixel can reduce the difference in luminance characteristics between the normal pixel and the dummy pixel based on the high-gray data voltage. Additionally, increasing the channel width or decreasing the channel length of the dummy driving transistor in the dummy pixel compared to the normal pixel can reduce the difference in luminance characteristics between the normal pixel and the dummy pixel based on the high-gray data voltage. Furthermore, decreasing the capacitance of the dummy storage capacitor in the dummy pixel compared to the normal pixel can reduce the difference in luminance characteristics between the normal pixel and the dummy pixel based on the high-gray data voltage. Moreover, increasing the capacitance of the dummy compensation capacitor and decreasing the capacitance of the dummy storage capacitor in the dummy pixel compared to the normal pixel can reduce the difference in luminance characteristics between the normal pixel and the dummy pixel based on the high-gray data voltage.

In FIG. 7, REF represents the luminance characteristics of a normal pixel according to a low-gray data voltage. For example, it represents the driving current I_OLED according to a low-gray data voltage. EX1 represents the luminance characteristics of a dummy pixel with a pixel driving circuit identical to a normal pixel according to a low-gray data voltage. EX4 represents the luminance characteristics of a dummy pixel applying a dummy reset voltage that varies with the data voltage to the anode electrode of the light-emitting element according to a low-gray data voltage. EX5 represents the luminance characteristics of a dummy pixel including at least one of EX4, EX2, and EX3 according to a low-gray data voltage.

Referring to FIG. 7, varying the dummy reset voltage with the data voltage in the dummy pixel can reduce the difference in luminance characteristics between the normal pixel and the dummy pixel based on the low-gray data voltage. Here, the dummy reset voltage D_VAR can have a value that varies proportionally to the data voltage, as shown in FIG. 8. Additionally, varying the dummy reset voltage with the data voltage and increasing the capacitance of the dummy compensation capacitor compared to the normal pixel in the dummy pixel can reduce the difference in luminance characteristics between the normal pixel and the dummy pixel based on the low-gray data voltage.

FIGS. 9 to 13 are circuit diagrams of pixels in an organic light-emitting display apparatus according to various embodiments of this disclosure.

The dummy pixel can be similar to the pixel driving circuit of the pixel in the active area shown in FIGS. 9 to 13. However, as described above, the dummy pixel can include a dummy reset voltage that varies with the data voltage compared to the pixel in the active area. Alternatively, the dummy pixel can include a dummy compensation capacitor with a larger capacitance than the pixel in the active area. Alternatively, the dummy pixel can include a dummy driving transistor with a larger channel width or a smaller channel length than the pixel in the active area. Alternatively, the dummy pixel can include a dummy storage capacitor with a smaller capacitance than the pixel in the active area. Alternatively, the dummy pixel can include a dummy compensation capacitor with a larger capacitance than the pixel in the active area and a dummy storage capacitor with a smaller capacitance than the pixel in the active area.

In describing the embodiments of FIGS. 9 to 13, descriptions of components identical or corresponding to those in previous embodiments will be omitted or may be briefly provided.

Figure 9:
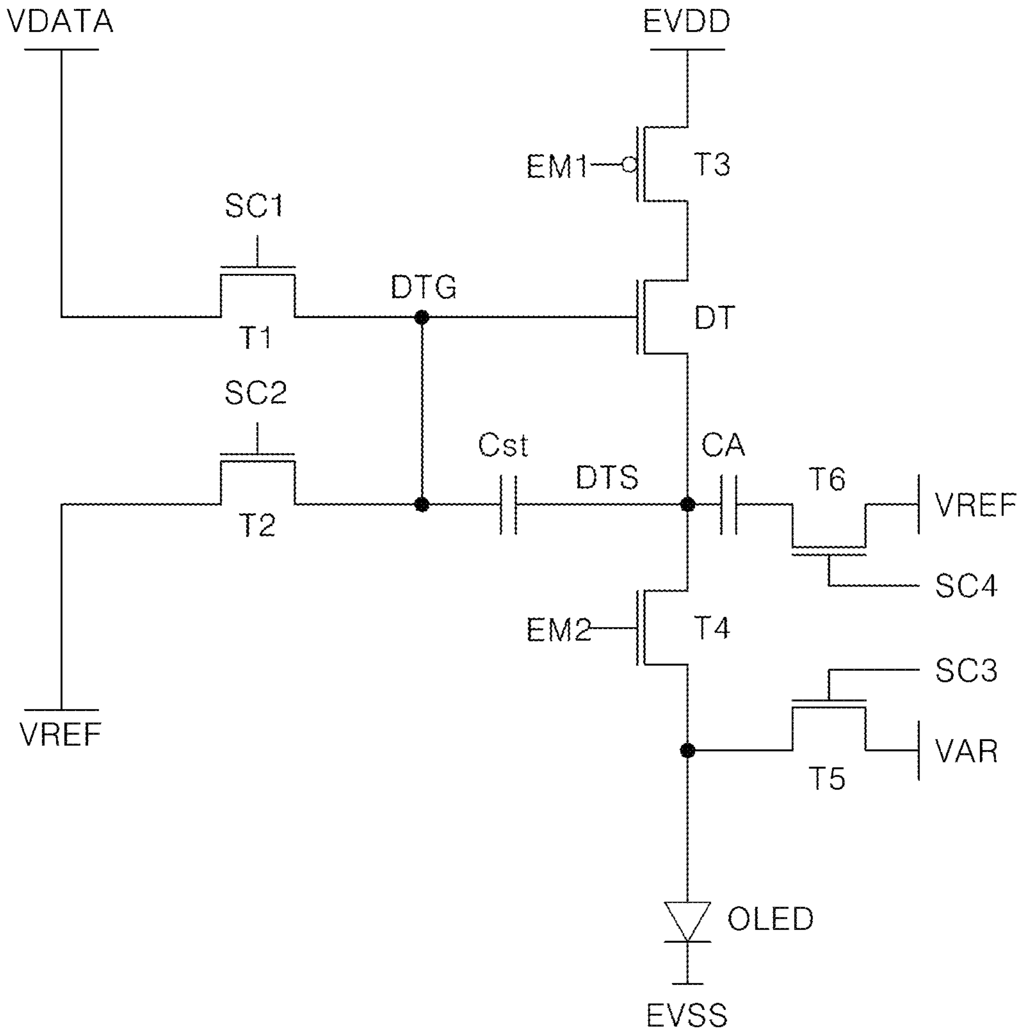
FIGS. 9 to 13 are circuit diagrams of pixels in an organic light-emitting display apparatus according to various embodiments of this disclosure.

Referring to FIG. 9, in the pixel driving circuit, the third transistor T3 can be a P-type thin-film transistor. The driving transistor DT and the first, second, fourth, fifth, and sixth transistors T1, T2, T4, T5, and T6 can be N-type thin-film transistors.

Figure 10:
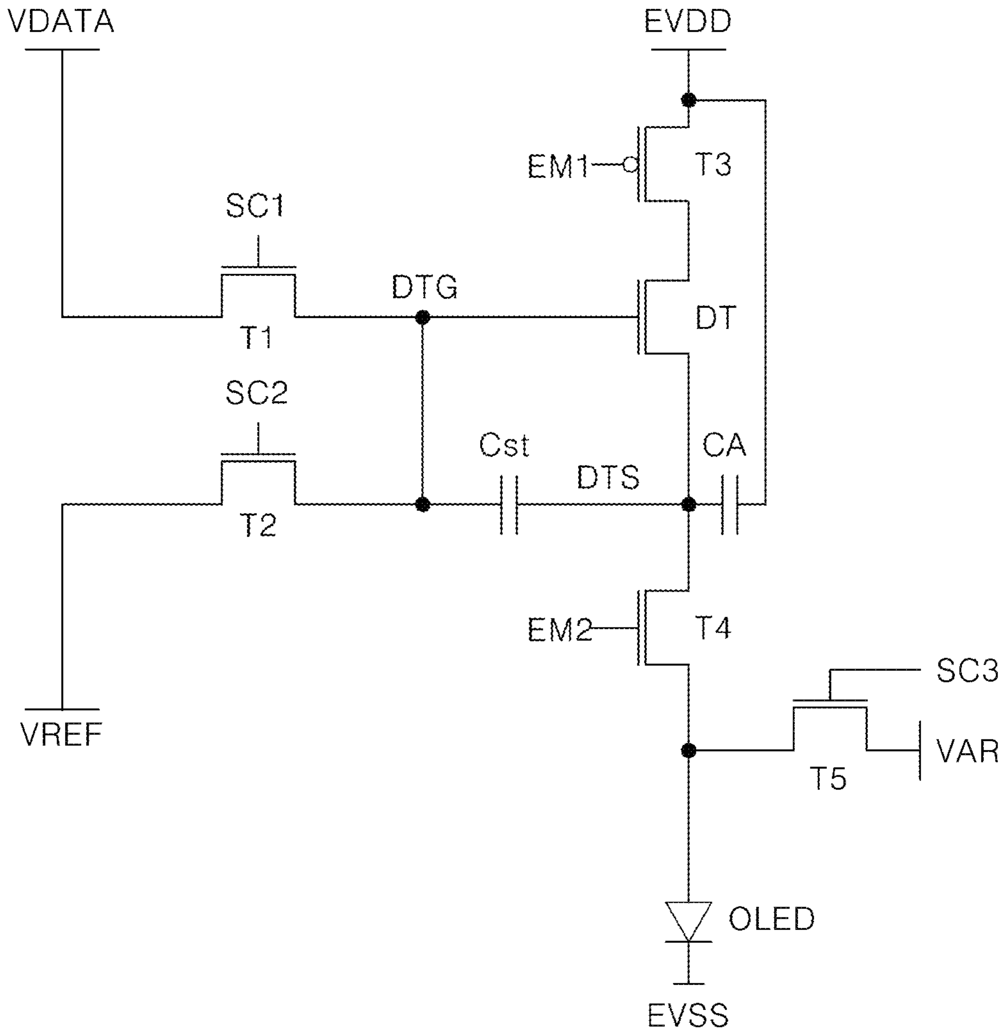

Referring to FIG. 10, in the pixel driving circuit, the compensation capacitor CA can have one electrode connected to the source electrode DTS of the driving transistor DT and the other electrode directly connected to the high-potential driving voltage EVDD.

Figure 11:
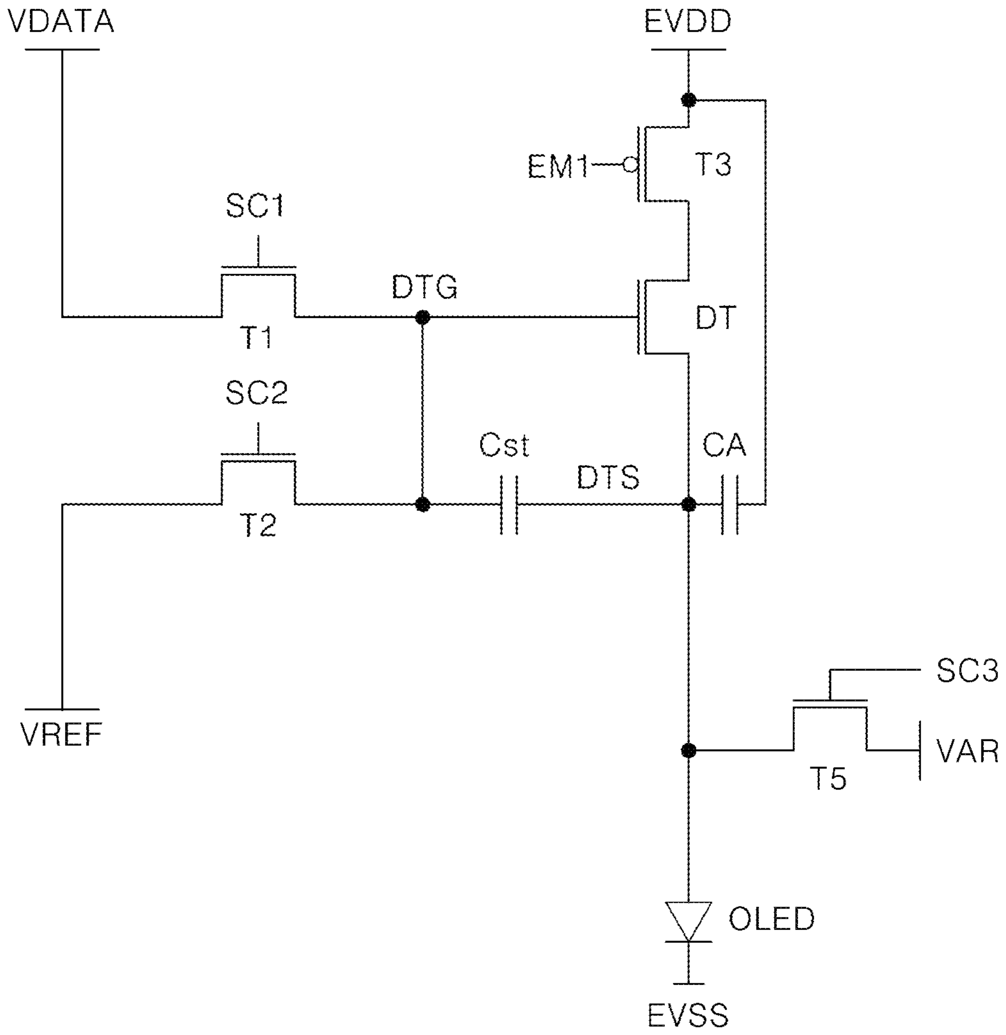

Referring to FIG. 11, in the pixel driving circuit, the anode electrode of the light-emitting element OLED can be directly connected to the source electrode DTS of the driving transistor DT without the fourth transistor T4.

Figure 12:
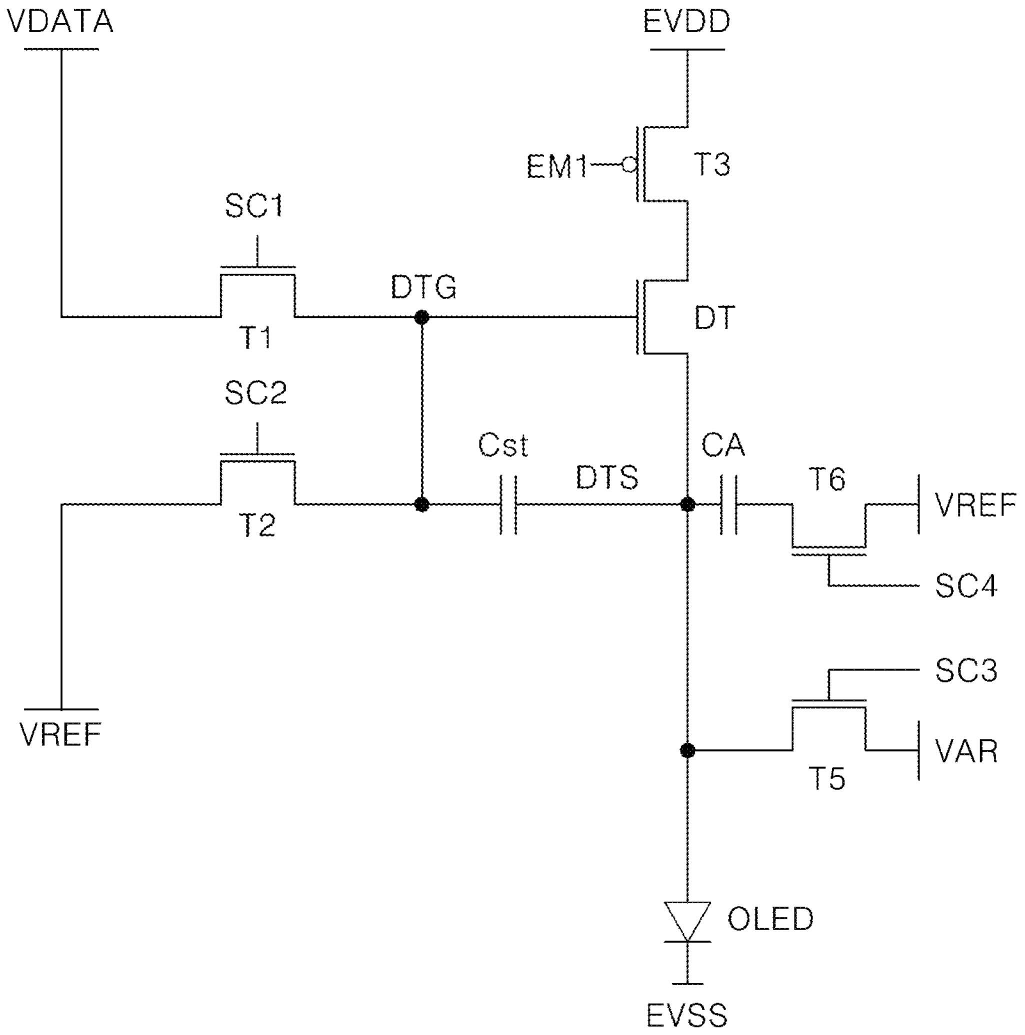

Referring to FIG. 12, in the pixel driving circuit, the compensation capacitor CA can have one electrode connected to the source electrode DTS of the driving transistor DT and the other electrode connected to the reference voltage VREF through the sixth transistor T6. Additionally, in the pixel driving circuit, the anode electrode of the light-emitting element OLED can be directly connected to the source electrode DTS of the driving transistor DT without the fourth transistor T4.

Figure 13:
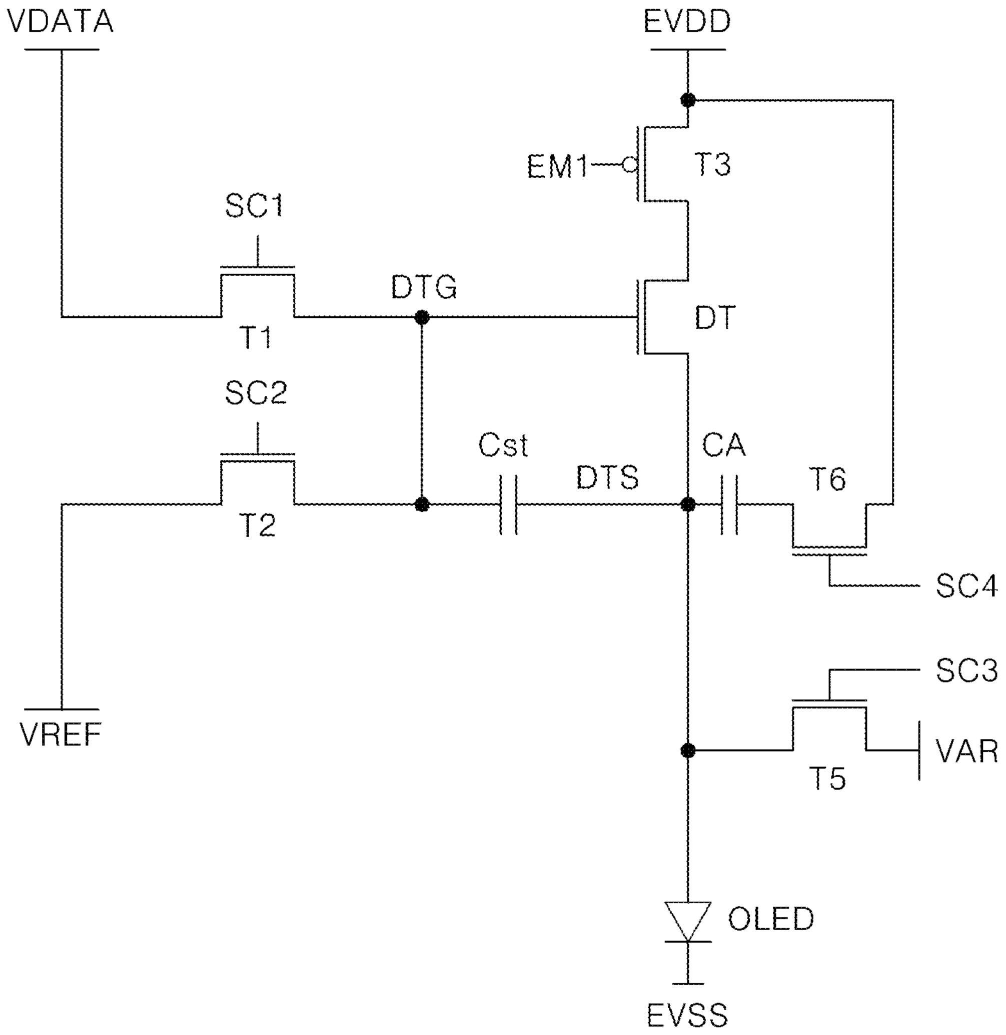

Referring to FIG. 13, in the pixel driving circuit, the compensation capacitor CA can have one electrode connected to the source electrode DTS of the driving transistor DT and the other electrode connected to the high-potential driving voltage EVDD through the sixth transistor T6. Additionally, in the pixel driving circuit, the anode electrode of the light-emitting element OLED can be directly connected to the source electrode DTS of the driving transistor DT without the fourth transistor T4.

A display apparatus according to one or more embodiments of this disclosure includes a display panel including a plurality of pixels, a plurality of dummy pixels, and a repair wiring, wherein the plurality of dummy pixels include a dummy driving transistor configured to drive a light-emitting element of a defective pixel among the plurality of pixels, a dummy compensation capacitor connected between a source electrode of the dummy driving transistor and a DC voltage, and a dummy transistor configured to supply a dummy reset voltage, which varies with a data voltage, to a dummy reset node connected to the repair wiring.

According to some embodiments of this disclosure, the dummy reset voltage can vary in proportion to the data voltage.

According to some embodiments of this disclosure, the dummy compensation capacitor can have a larger capacitance than a compensation capacitor provided in the plurality of pixels.

According to some embodiments of this disclosure, the dummy driving transistor can have a larger channel width than a driving transistor provided in the plurality of pixels.

According to some embodiments of this disclosure, the dummy driving transistor can have a smaller channel length than the driving transistor provided in the plurality of pixels.

According to some embodiments of this disclosure, the plurality of dummy pixels can further include a dummy storage capacitor having one electrode connected to a gate electrode of the dummy driving transistor and the other electrode connected to the source electrode of the dummy driving transistor, and the dummy storage capacitor can have a smaller capacitance than a storage capacitor provided in the plurality of pixels.

According to some embodiments of this disclosure, an anode electrode of the light-emitting element of the defective pixel can be disconnected from a pixel driving circuit of the defective pixel and connected to the repair wiring, and the dummy reset node of the dummy pixel is connected to the repair wiring.

According to some embodiments of this disclosure, the dummy transistor can operate in response to a scan signal activated during a period for resetting an anode electrode of the plurality of pixels.

A display apparatus according to one or more embodiments of this disclosure includes a display panel including a plurality of pixels, a plurality of dummy pixels, and a repair wiring, wherein the plurality of dummy pixels can include a dummy driving transistor configured to output a driving current corresponding to a data voltage to drive a light-emitting element of a defective pixel among the plurality of pixels, a dummy storage capacitor having one electrode connected to a gate electrode of the dummy driving transistor and the other electrode connected to a source electrode of the dummy driving transistor, a first dummy transistor having one electrode connected to the data voltage and the other electrode connected to the gate electrode of the dummy driving transistor and one electrode of the dummy storage capacitor, a second dummy transistor having one electrode connected to a reference voltage and the other electrode connected to the gate electrode of the dummy driving transistor and one electrode of the dummy storage capacitor, a third dummy transistor having one electrode connected to a high-potential driving voltage and the other electrode connected to a drain electrode of the dummy driving transistor, a dummy compensation capacitor having one electrode connected to the source electrode of the dummy driving transistor and the other electrode connected to a DC voltage, and a fourth dummy transistor having one electrode connected to a dummy reset voltage that varies with the data voltage and the other electrode connected to a dummy reset node connected to the source electrode of the dummy driving transistor.

According to some embodiments of this disclosure, the plurality of dummy pixels can further include a fifth dummy transistor having one electrode connected to the source electrode of the dummy driving transistor and the other electrode connected to the dummy reset node.

According to some embodiments of this disclosure, the plurality of dummy pixels can further include a sixth dummy transistor having one electrode connected to the other electrode of the dummy compensation capacitor and the other electrode connected to the DC voltage.

According to some embodiments of this disclosure, the DC voltage can be the reference voltage or the high-potential driving voltage.

According to some embodiments of this disclosure, the third dummy transistor can be a P-type thin-film transistor, and the dummy driving transistor, the first, second, fourth, fifth, and sixth dummy transistors can be N-type thin-film transistors.

According to some embodiments of this disclosure, an anode electrode of the light-emitting element of the defective pixel can be disconnected from a pixel driving circuit of the defective pixel and connected to the repair wiring, and the dummy reset node of the dummy pixel is connected to the repair wiring.

According to some embodiments of this disclosure, the fourth dummy transistor can operate in response to a scan signal activated during a period for resetting an anode electrode of the light-emitting element.

According to some embodiments of this disclosure, the dummy reset voltage can vary in proportion to the data voltage.

According to some embodiments of this disclosure, the dummy compensation capacitor can have a larger capacitance than a compensation capacitor provided in the plurality of pixels.

According to some embodiments of this disclosure, the dummy driving transistor can have a larger channel width than a driving transistor provided in the plurality of pixels.

According to some embodiments of this disclosure, the dummy driving transistor can have a smaller channel length than the driving transistor provided in the plurality of pixels.

According to some embodiments of this disclosure, the dummy storage capacitor can have a smaller capacitance than a storage capacitor provided in the plurality of pixels.

According to some embodiments of this disclosure, a display apparatus includes a dummy transistor that supplies a dummy reset voltage, varying with a data voltage, to a dummy reset node, thereby reducing luminance characteristic differences between a dummy pixel and a normal pixel at low-luminance data voltages.

Additionally, according to aspects of this disclosure, the display apparatus configures a dummy compensation capacitor of the dummy pixel to have a larger capacitance than that of a pixel in an active area, thereby reducing luminance characteristic differences between the dummy pixel and the normal pixel at high-grayscale data voltages.

Further, according to aspects of this disclosure, the display apparatus configures a dummy driving transistor of the dummy pixel to have a larger channel width or a smaller channel length than that of a pixel in the active area, thereby reducing luminance characteristic differences between the normal pixel and the dummy pixel at high-grayscale data voltages, even when a defective pixel occurs in the center of the active area.

Moreover, according to aspects of this disclosure, the display apparatus configures a dummy storage capacitor of the dummy pixel to have a smaller capacitance than that of a pixel in the active area, thereby reducing luminance characteristic differences between the normal pixel and the dummy pixel at high-grayscale data voltages.

According to aspects of this disclosure, the display apparatus also reduces luminance characteristic differences between the normal pixel and the dummy pixel at both low-grayscale and high-grayscale data voltages, thus addressing the prior art issue of requiring a data driver designed with a wide operating range to compensate for high and low grayscale.

Furthermore, according to aspects of this disclosure, the display apparatus can compensate for luminance characteristic differences within the operating range of the data driver by reducing luminance characteristic differences between the dummy pixel and the normal pixel at low-grayscale and high-grayscale data voltages.

According to aspects of this disclosure, the display apparatus also reduces luminance characteristic differences between the dummy pixel and the normal pixel with respect to data voltages, thereby preventing dark spots or bright spots which can be caused by defective pixels.

Additionally, according to aspects of this disclosure, when a defective pixel occurs due to a defect in the pixel driving circuit, the display apparatus can drive the light-emitting element of the defective pixel by cutting the light-emitting element and the pixel driving circuit of the defective pixel and connecting the pixel driving circuit of the dummy pixel to the light-emitting element of the defective pixel.

Moreover, according to aspects of this disclosure, the display apparatus can drive a defective pixel using dummy pixels disposed on the left and right sides of the active area, thereby improving the yield of the display panel.

Further, according to aspects of this disclosure, the display apparatus can reduce luminance characteristic differences between the dummy pixel and the normal pixel with respect to data voltages, even when a pixel in the center of the active area is defective and the parasitic capacitance of a repair line is large.

Additionally, according to aspects of this disclosure, the display apparatus can reduce luminance characteristic differences between the dummy pixel and the normal pixel with respect to data voltages, making pixels more robust to data voltage variations.

Further, according to aspects of this disclosure, the display apparatus can prevent dark spots or bright spots which can be caused by defective pixels, thereby improving image quality.

In addition to the aforementioned effects, other advantageous effects of the present invention will be provided along with the detailed description of the invention.

Although embodiments of this disclosure have been described in detail with reference to the accompanying drawings, it should be noted that the disclosure is not necessarily limited to these embodiments and can be modified in various ways without departing from the scope of the technical concept of the invention. Therefore, the embodiments disclosed in this specification are not intended to limit but to describe the technical ideas of the disclosure, and the scope of the technical ideas of the disclosure is not limited by the embodiments. Therefore, it should be understood that the embodiments described above are exemplary and not limited in all aspects. The scope of protection of technical ideas of the present disclosure shall be construed by the following claims, and all technical ideas within the scope equivalent thereto shall be construed as being within the scope of the rights of the present disclosure.

What is claimed is:

1. A display apparatus comprising:

a display panel including a plurality of pixels, a plurality of dummy pixels, and a repair wiring, wherein the plurality of dummy pixels comprise:

a dummy driving transistor configured to drive a light-emitting element of a defective pixel among the plurality of pixels;

a dummy compensation capacitor connected between a source electrode of the dummy driving transistor and a direct current (DC) voltage;

a dummy transistor configured to supply a dummy reset voltage, which varies with a data voltage, to a dummy reset node connected to the repair wiring; and a dummy storage capacitor having one electrode connected to a gate electrode of the dummy driving transistor and another electrode connected to the source electrode of the dummy driving transistor, wherein the dummy storage capacitor has a smaller capacitance than a storage capacitor provided in the plurality of pixels.

2. The display apparatus of claim 1, wherein the dummy reset voltage varies in proportion to the data voltage.

3. The display apparatus of claim 1, wherein the dummy compensation capacitor has a larger capacitance than a compensation capacitor provided in the plurality of pixels.

4. The display apparatus of claim 1, wherein the dummy driving transistor has a larger channel width than a driving transistor provided in the plurality of pixels.

5. The display apparatus of claim 4, wherein the dummy driving transistor has a smaller channel length than the driving transistor provided in the plurality of pixels.

6. The display apparatus of claim 1, wherein an anode electrode of the light-emitting element of the defective pixel is disconnected from a pixel driving circuit of the defective pixel and is connected to the repair wiring, and wherein the dummy reset node of a dummy pixel of the plurality of dummy pixels is connected to the repair wiring.

7. The display apparatus of claim 1, wherein the dummy transistor operates in response to a scan signal activated during a period for resetting an anode electrode of the plurality of pixels.

8. A display apparatus comprising:

a display panel including a plurality of pixels, a plurality of dummy pixels, and a repair wiring, wherein the plurality of dummy pixels include:

a dummy driving transistor configured to output a driving current corresponding to a data voltage to drive a light-emitting element of a defective pixel among the plurality of pixels;

a dummy storage capacitor having one electrode connected to a gate electrode of the dummy driving transistor and another electrode connected to a source electrode of the dummy driving transistor;

a first dummy transistor having one electrode connected to the data voltage and another electrode connected to the gate electrode of the dummy driving transistor and one electrode of the dummy storage capacitor;

a second dummy transistor having one electrode connected to a reference voltage and another electrode connected to the gate electrode of the dummy driving transistor and one electrode of the dummy storage capacitor;

a third dummy transistor having one electrode connected to a high-potential driving voltage and another electrode connected to a drain electrode of the dummy driving transistor;

a dummy compensation capacitor having one electrode connected to the source electrode of the dummy driving transistor and another electrode connected to a direct current (DC) voltage; and a fourth dummy transistor having one electrode connected to a dummy reset voltage that varies with the data voltage and another electrode connected to a dummy reset node connected to the source electrode of the dummy driving transistor.

9. The display apparatus of claim 8, wherein the plurality of dummy pixels further include a fifth dummy transistor having one electrode connected to the source electrode of the dummy driving transistor and another electrode connected to the dummy reset node.

10. The display apparatus of claim 9, wherein the plurality of dummy pixels further include a sixth dummy transistor having one electrode connected to the another electrode of the dummy compensation capacitor and another electrode connected to the DC voltage.

11. The display apparatus of claim 10, wherein the DC voltage is the reference voltage or the high-potential driving voltage.

12. The display apparatus of claim 10, wherein the third dummy transistor is a P-type thin-film transistor, and wherein the dummy driving transistor, and the first, second, fourth, fifth, and sixth dummy transistors are N-type thin-film transistors.

13. The display apparatus of claim 8, wherein an anode electrode of the light-emitting element of the defective pixel is disconnected from a pixel driving circuit of the defective pixel and is connected to the repair wiring, and wherein the dummy reset node of a dummy pixel of the plurality of dummy pixels is connected to the repair wiring.

14. The display apparatus of claim 8, wherein the fourth dummy transistor operates in response to a scan signal activated during a period for resetting an anode electrode of the light-emitting element.

15. The display apparatus of claim 8, wherein the dummy reset voltage varies in proportion to the data voltage.

16. The display apparatus of claim 8, wherein the dummy compensation capacitor has a larger capacitance than a compensation capacitor provided in the plurality of pixels.

17. The display apparatus of claim 8, wherein the dummy driving transistor has a larger channel width than a driving transistor provided in the plurality of pixels.

18. The display apparatus of claim 17, wherein the dummy driving transistor has a smaller channel length than the driving transistor provided in the plurality of pixels.

19. The display apparatus of claim 8, wherein the dummy storage capacitor has a smaller capacitance than a storage capacitor provided in the plurality of pixels.

* * * * *